(12) United States Patent
Lefavour et al.

(10) Patent No.: US 7,533,556 B2
(45) Date of Patent: May 19, 2009

(54) HYDRAULIC TOOL RELEASE SYSTEM

(75) Inventors: John D. Lefavour, Litchfield, NH (US);
Armand T. Montminy, Manchester, NH (US)

(73) Assignee: FCI Americas Technology, Inc., Carson City, NV (US)

( * ) Notice: Subject to any disclaimer, the term of this patent is extended or adjusted under 35 U.S.C. 154(b) by 483 days.

(21) Appl. No.: 11/377,701

(22) Filed: Mar. 15, 2006

(65) Prior Publication Data
US 2007/0214861 A1 Sep. 20, 2007

(51) Int. Cl.
*B21J 9/12* (2006.01)
*F15B 15/18* (2006.01)

(52) U.S. Cl. .................... 72/453.16; 72/453.07; 60/477; 60/481

(58) Field of Classification Search .................... 72/407, 72/416, 453.02, 453.15, 453.16, 453.18; 60/477, 479, 480, 481; 137/454.5; 81/301
See application file for complete search history.

(56) References Cited

U.S. PATENT DOCUMENTS

| 2,688,231 A | 9/1954 | Northcutt ........................ 60/52 |
| 2,820,415 A | 1/1958 | Born ........................... 103/37 |
| 3,216,196 A | 11/1965 | Sund ............................. 60/51 |
| 4,206,603 A | 6/1980 | Mekler ........................ 60/477 |
| 4,339,942 A * | 7/1982 | Svensson .................. 72/453.16 |
| 4,942,757 A * | 7/1990 | Pecora ...................... 72/453.16 |
| 4,947,672 A | 8/1990 | Pecora et al. ............. 72/453.16 |
| 5,150,644 A | 9/1992 | Kimura ........................ 91/395 |
| 5,195,042 A | 3/1993 | Ferraro et al. ............... 364/468 |
| 5,727,417 A | 3/1998 | Moffatt et al. ............ 72/453.03 |
| 5,979,215 A * | 11/1999 | Lefavour et al. .......... 72/453.16 |
| 6,276,186 B1 | 8/2001 | Frenken .................... 72/453.15 |
| 6,564,610 B2 | 5/2003 | Lefavour et al. .......... 72/453.16 |
| 6,666,064 B2 * | 12/2003 | LeFavour et al. ......... 72/453.15 |
| 7,066,003 B2 * | 6/2006 | Lefavour et al. .......... 72/453.16 |
| 7,254,982 B2 | 8/2007 | Frenken .................... 72/453.15 |
| 2003/0126905 A1 | 7/2003 | Frenken .................... 72/453.16 |

OTHER PUBLICATIONS

Product brochure for REC-EZBG Battery Powered In-Line Compression Tool, Huskie Tools Inc., Sep. 2005, 1 page.
"GATOR EK425 Battery-Powered Crimping Tool" Instruction Manual, Fairmont, Greenlee Textron, 2006, 14 pages.

* cited by examiner

*Primary Examiner*—David B Jones
(74) *Attorney, Agent, or Firm*—Harrington & Smith PC (57) ABSTRACT

A hydraulic tool including a frame; a ram movably connected to the frame; and a hydraulic drive system on the frame for moving the ram on the frame by hydraulic pressure. The hydraulic drive system includes an automatic release system for automatically releasing hydraulic fluid from the hydraulic drive system. The automatic release system comprises a first valve which is adapted to be automatically opened by a predetermined hydraulic pressure and a second valve which is adapted to be opened by hydraulic fluid passing through the first valve.

25 Claims, 7 Drawing Sheets

HYDRAULIC TOOL RELEASE SYSTEM

BACKGROUND OF THE INVENTION

1. Field of the Invention

The invention relates to a hydraulic tool and, more particularly, to a hydraulic fluid release system in a hydraulic tool.

2. Brief Description of Prior Developments

U.S. Patent Application Publication No. US 2003/0126905 A1 discloses a hydraulic pressing unit with an automatic hydraulic fluid release system that remains open until the ram is fully retracted. Manual hydraulic fluid release systems are also known in the art such as described in U.S. Pat. Nos. 4,947,672 and 6,564,610.

The subject invention can relate to hydraulic crimp tools and hydraulic cutting tools and the employment of an automated release valve that is pressure actuated. In detail, there is a need, but not limited to, an automatic release mechanism that after a predetermined pressure is reached, automatically retracts the crimp ram or cutting ram from the work piece.

There are other automatic retraction devices such as described in US2003/0126905 and U.S. Pat. No. 6,276,186. US2003/0126905 incorporates different mechanical or electrical latching devices to hold the non-return valve (relief valve) open. It incorporates mechanical latches and the relief valve (non return valve) is held opened until the ram is fully back which releases the valve to the closed position. Latching this valve open mechanical or electrically can gall and create metal galling and metal shavings that can easily contaminate the hydraulic circuit. The design in U.S. Pat. No. 6,276,186 is somewhat similar to many relief valves designs where the leading tip of the valve needle is conical and is of small area. When a predetermined pressure is reached the needle lifts and allows fluid to act on the larger secondary disc portion of the valve. In this patent the relief valve remains open until the ram is fully back to the rest position and pressure is near zero. This design requires the hydraulic fluid pass through the relief valve until the ram is fully back. This practice is common in the art. The secondary disc is sized such that the valve does not close until pressure is very low and, thus, full ram retraction or auto retraction. Traditional tool valves open and drop pressure to about 2000 psi. The valve then fully closes and the operator of the tool must actuate a mechanical release to retract the ram.

SUMMARY OF THE INVENTION

In accordance with one aspect of the invention, a hydraulic tool is provided including a frame; a ram movably connected to the frame; and a hydraulic drive system on the frame for moving the ram on the frame by hydraulic pressure. The hydraulic drive system includes an automatic release system for automatically releasing hydraulic fluid from the hydraulic drive system. The automatic release system comprises a first valve which is adapted to be automatically opened by a predetermined hydraulic pressure and a second valve which is adapted to be opened by hydraulic fluid passing through the first valve.

In accordance with another aspect of the invention, a hydraulic tool is provided comprising a frame; a ram movably connected to the frame; and a hydraulic drive system on the frame for moving the ram on the frame by hydraulic pressure. The hydraulic drive system comprises an automatic release system for automatically releasing hydraulic fluid from the hydraulic drive system. The automatic release system comprises a first valve and a second valve. The second valve is adapted to be closed by physical contact of the ram against a bumper portion of the second valve.

In accordance with another aspect of the invention, a hydraulic tool is provided comprising a frame; a ram movably connected to the frame; and a hydraulic drive system on the frame for moving the ram on the frame by hydraulic pressure. The hydraulic drive system comprises an automatic release system for automatically releasing hydraulic fluid from the hydraulic drive system and a manual release system for manually releasing hydraulic fluid from the hydraulic drive system. The automatic release system comprises a first valve and a second valve. The manual release system is adapted to allow a user to manually move a portion of the first valve or the second valve.

BRIEF DESCRIPTION OF THE DRAWINGS

The foregoing aspects and other features of the invention are explained in the following description, taken in connection with the accompanying drawings, wherein.

DETAILED DESCRIPTION OF THE PREFERRED EMBODIMENTS

Figure 1:
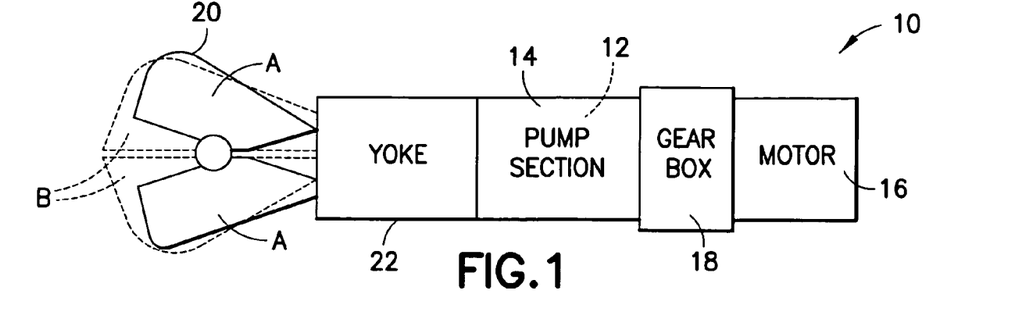
FIG. 1 is a side view of a tool comprising features of the invention.

Referring to FIG. 1, there is shown a side view of a hydraulic tool 10 incorporating features of the invention. Although the invention will be described with reference to the exemplary embodiments shown in the drawings, it should be understood that the invention can be embodied in many alternate forms of embodiments. In addition, any suitable size, shape or type of elements or materials could be used.

Figure 2:
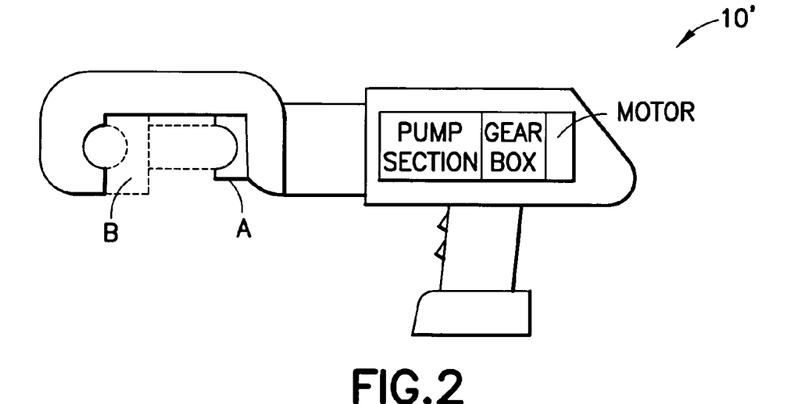
FIG. 2 is a side view of an alternate embodiment of the invention.
Figure 3:
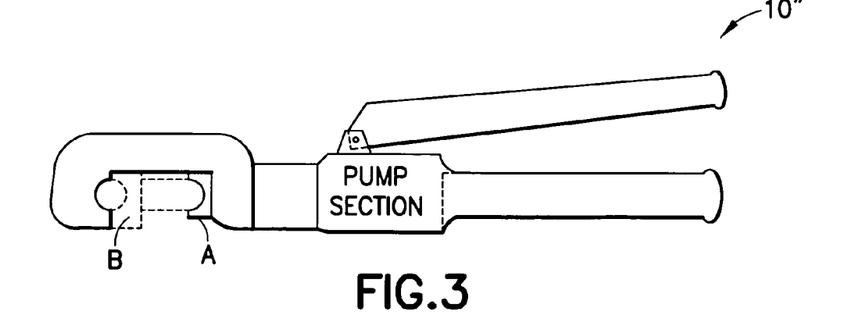
FIG. 3 is a side view of an alternate embodiment of the invention.

The tool 10 generally comprises a frame 12, a pump 14 on the frame 12, a motor 16 connected to the pump by a gear box or transmission 18, and a working head 20. The working head 20 can comprise a crimp head or a cutter head for example. The tool 10 comprises a yoke section 22, such as comprising a ram, which can be moved by hydraulic pressure from the pump 14 to move the working head 20 between a home or rest position, illustrated as position A, and an actuated position, illustrated as position B. FIG. 1 shows an in-line type of tool. FIG. 2 shows a similar tool 10', but in a pistol type of configuration. FIG. 3 shows a similar tool 10'', but in a dual handle type of configuration. In another alternate embodiment, the hydraulic tool could be a suitcase style of tool similar to that shown in U.S. Pat. No. 5,727,417.

Figure 4:
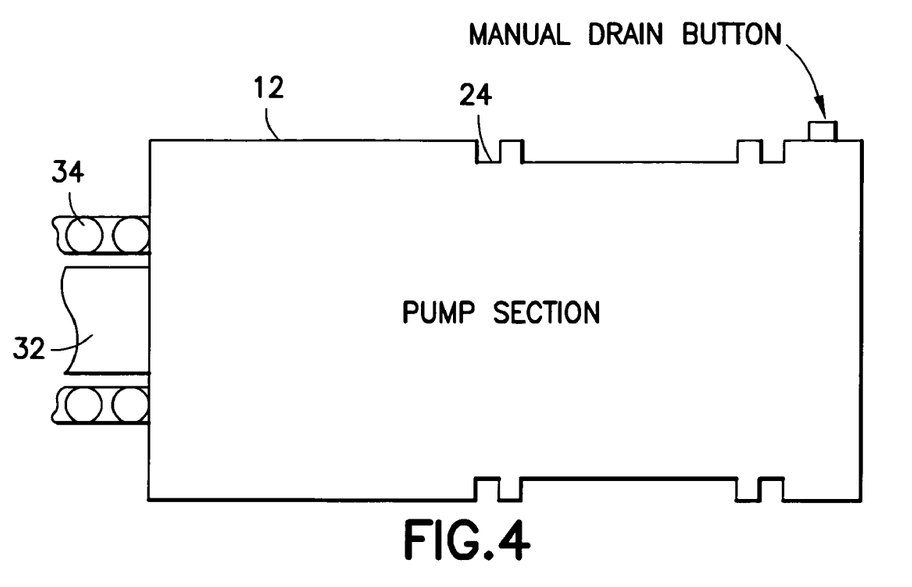
FIG. 4 is a side view of one component of the frame and the ram and ram spring of the tool shown in FIG. 1.
Figure 5:
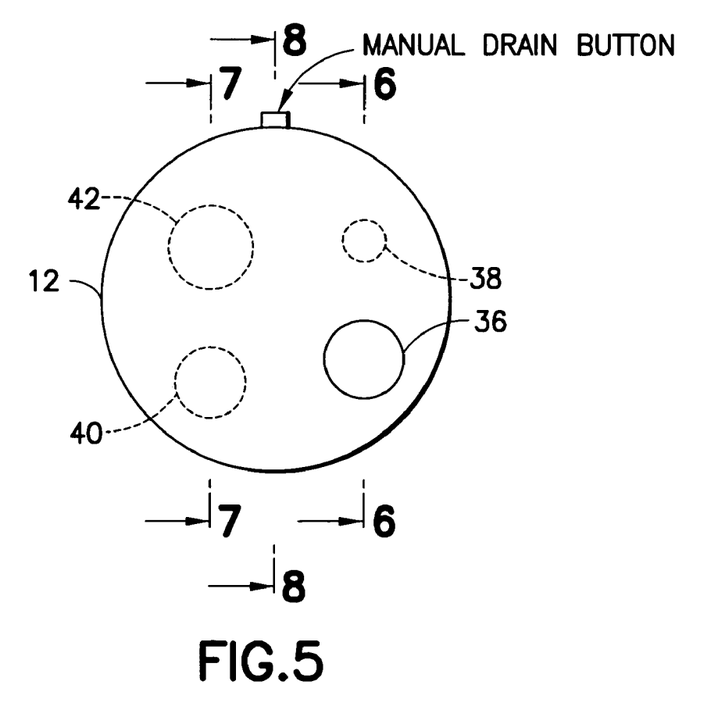
FIG. 5 is an end view of the frame shown in FIG. 4.
Figure 6:
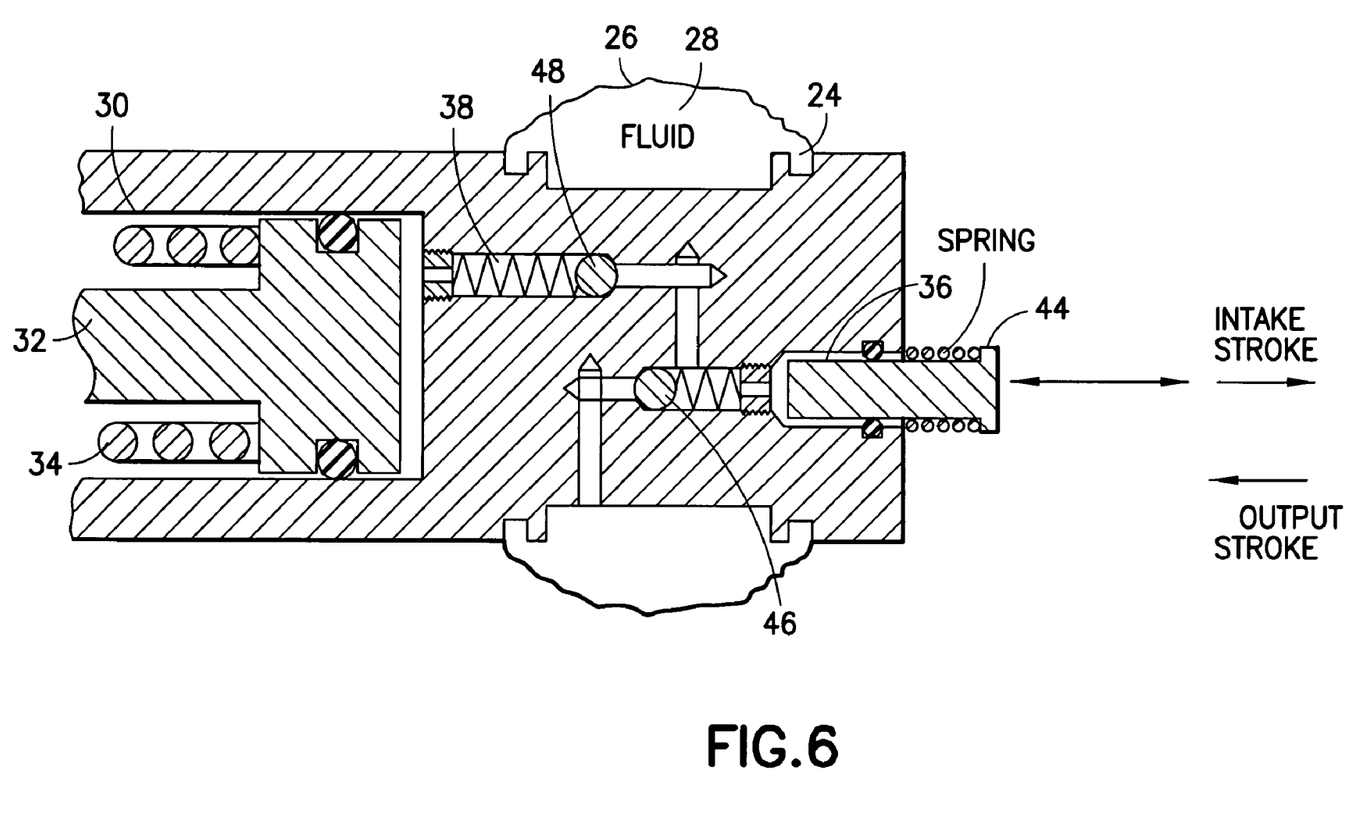
FIG. 6 is cross sectional view of portions of the tool shown in FIG. 1 taken along line 6-6 of FIG. 5.

Referring also to FIGS. 4-6, the frame 12 includes an outer section 24 which receives a bladder 26 for forming a hydraulic fluid reservoir 28 surrounding a portion of the frame 12.

The frame 12 has various channels and cylinders for forming a hydraulic fluid drive system. The front of the frame 12 has a ram cylinder 30. The ram cylinder 30 has a portion of the ram 32 movably located therein. A spring 34 biases the ram 32 towards a rearward direction. The frame 12 includes a piston pump hole 36, a pump outlet check valve hole 38, a relief valve hole 40, a pilot actuated drain valve hole 42, and various cross linking channels.

A piston pump member 44 is movably located in the hole 36 for reciprocal motion. A spring loaded pump inlet check valve 46 is also located in the hole 36. The piston pump member 44 and the pump inlet check valve 46 allow hydraulic fluid to be sucked into the hole 36 and then pushed through the pump outlet check valve 48 into the ram cylinder 30. In an alternate embodiment, any suitable hydraulic pump system could be provided.

Figure 7:
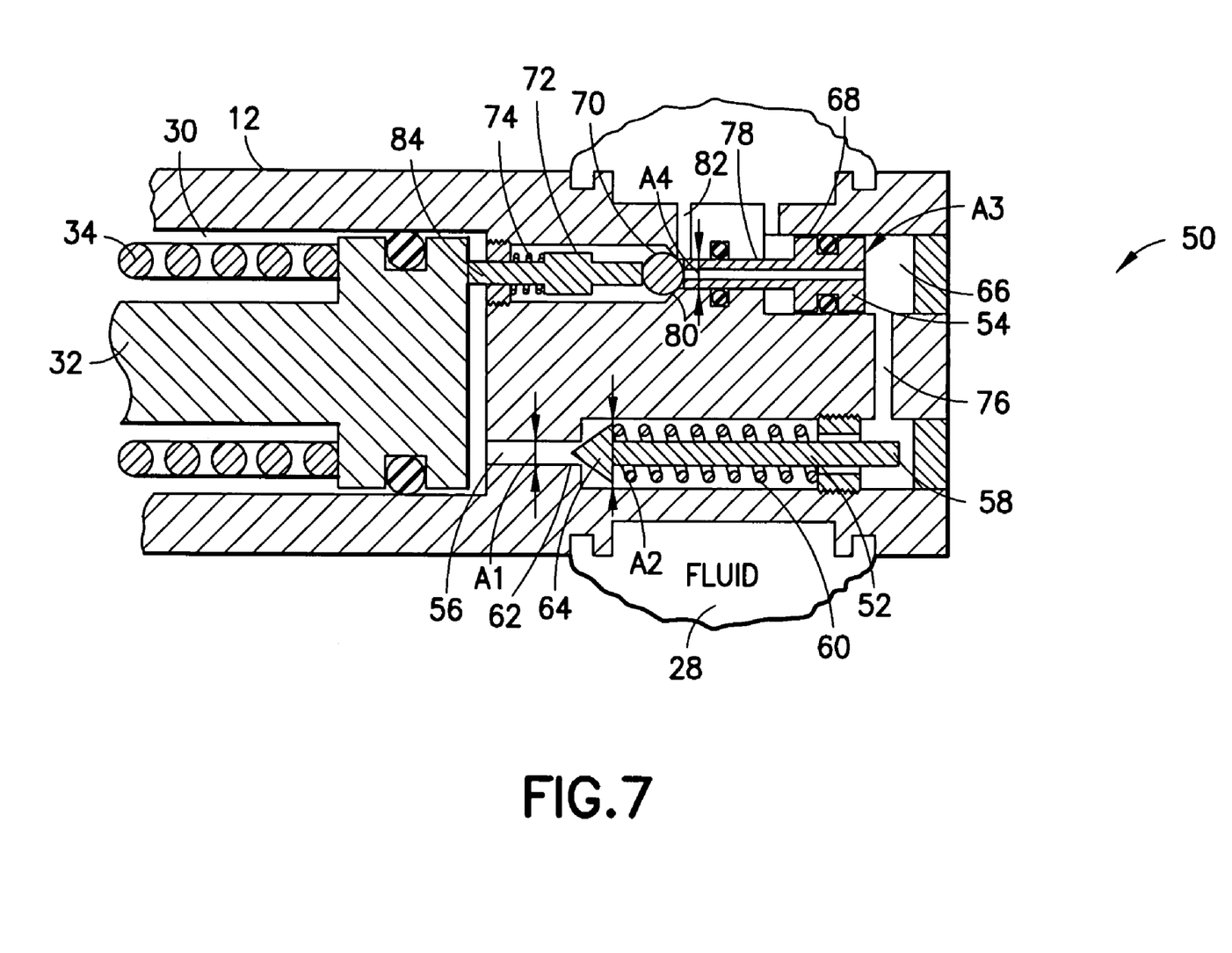
FIG. 7 is cross sectional view of portions of the tool shown in FIG. 1 taken along line 7-7 of FIG. 5.

Referring also to FIG. 7, an automatic release system 50 for automatically releasing hydraulic fluid from the hydraulic drive system back to the reservoir 28 is provided. The automatic release system 50 is adapted to be actuated when hydraulic pressure in the hydraulic drive system reaches a predetermined pressure, and allow the ram 32 to be automatically retracted by the spring 34. The automatic release system 50 generally comprises a first valve 52 and a second valve 54. The first and second valves 52, 54 are arranged in series with each other. The first valve 52 is adapted to be automatically opened by a predetermined hydraulic pressure. The second valve 54 is adapted to be opened by hydraulic fluid passing through the first valve 52.

The first valve 52 generally comprises a first channel 56, a valve needle 58 and a relief valve spring 60. The first channel 56 has two different dimensions A1 and A2 forming a valve seat 62 therebetween. The front of the valve needle 58 has a general cone shaped end 64 which is adapted to sit in the seat 62 to seal off the smaller diameter A1 portion of the channel 56 from the larger diameter A2 portion of the channel 56. The spring 60 biases the valve needle 58 in the seat 62. The smaller diameter A1 portion of the channel 56 communicates with the rear end of the ram cylinder 30.

When hydraulic pressure in the ram cylinder 30 reaches a predetermined pressure, the pressure acts on the area of the cone shaped end 64 at the valve seat equal to area A1 to move the valve needle 58 off of the seat; depressing the spring 60. This opens up the area of the cone shaped end 64 equal to about area A2 to the pressure; increasing the force on the valve needle 58. This keeps the first valve open even when the pressure is reduced below the predetermined pressure which resulted in the first valve opening.

The second valve 54 generally comprises a second channel 66, a pilot spool 68, a drain ball 70, a bumper 72, and a spring 74. The second channel 66 communicates with the ram cylinder 30 and with the first channel 56 via the conduit 76. Hydraulic fluid passing through the first valve 52 can pass through the conduit 76 into the rear end of the second channel 66. The pilot spool 68 has a rear end with an area A3 and a front end with a relatively smaller area A4. A channel 78 extends through the pilot spool between the front and rear ends. The pilot spool 68 is slidable in the second channel 66. The second channel 66 forms a valve seat 80 proximate an outlet 82 to the reservoir 28. The drain ball 70 is adapted to be sealed against the valve seat 80 by the bumper 72 and spring 74. The front end 84 of the bumper 72 is adapted to project into the ram cylinder 30.

The spring 74 and bumper 72 normally bias the drain ball 70 against the valve seat 80 and against the front opening of the channel 78 to substantially prevent hydraulic fluid from exiting out of the outlet 82. When the first valve 52 opens at a predetermined hydraulic pressure, hydraulic fluid can flow through the first valve 52 from the ram cylinder 30, through the conduit 76, and into the second valve 54. Because of the size difference between the areas A3 and A4 of the pilot spool 68 and because of the channel 78, the hydraulic fluid passing through the first valve 52 causes the pilot spool 68 to move forward and move the drain ball 70 off of the valve seat 80. The bumper 72 is moved forward and the spring 74 is compressed. A path to the outlet 82 from the second channel 66 is opened. Hydraulic fluid is, thus, able to move from the ram cylinder 30 back into the reservoir 28 through the second channel 66 and the outlet 82.

The second valve 54 stays open even after the first valve 52 is able to close. Hydraulic fluid is able to pass from the ram cylinder 30 around the bumper 72 and drain ball 70. Because the front of the bumper 72 extends into the ram cylinder 30, as the ram 32 is biased rearward by the spring 34, the rear end of the ram 32 is able to contact the bumper 72 and move the bumper 72 rearward to move the drain ball 70 back to its sealing position on the valve seat 80 as the ram reaches its rear position. Thus, the ram 32 moves the second valve 54 back to its sealing position. With the invention, the automatic release system is able to automatically open at a predetermined pressure, opening both the valves 52, 54, and automatically close when the ram 32 reaches its rearward position; the first valve 52 closing before the second valve 54 closes and before the ram reaches its rearward position.

Figure 8:
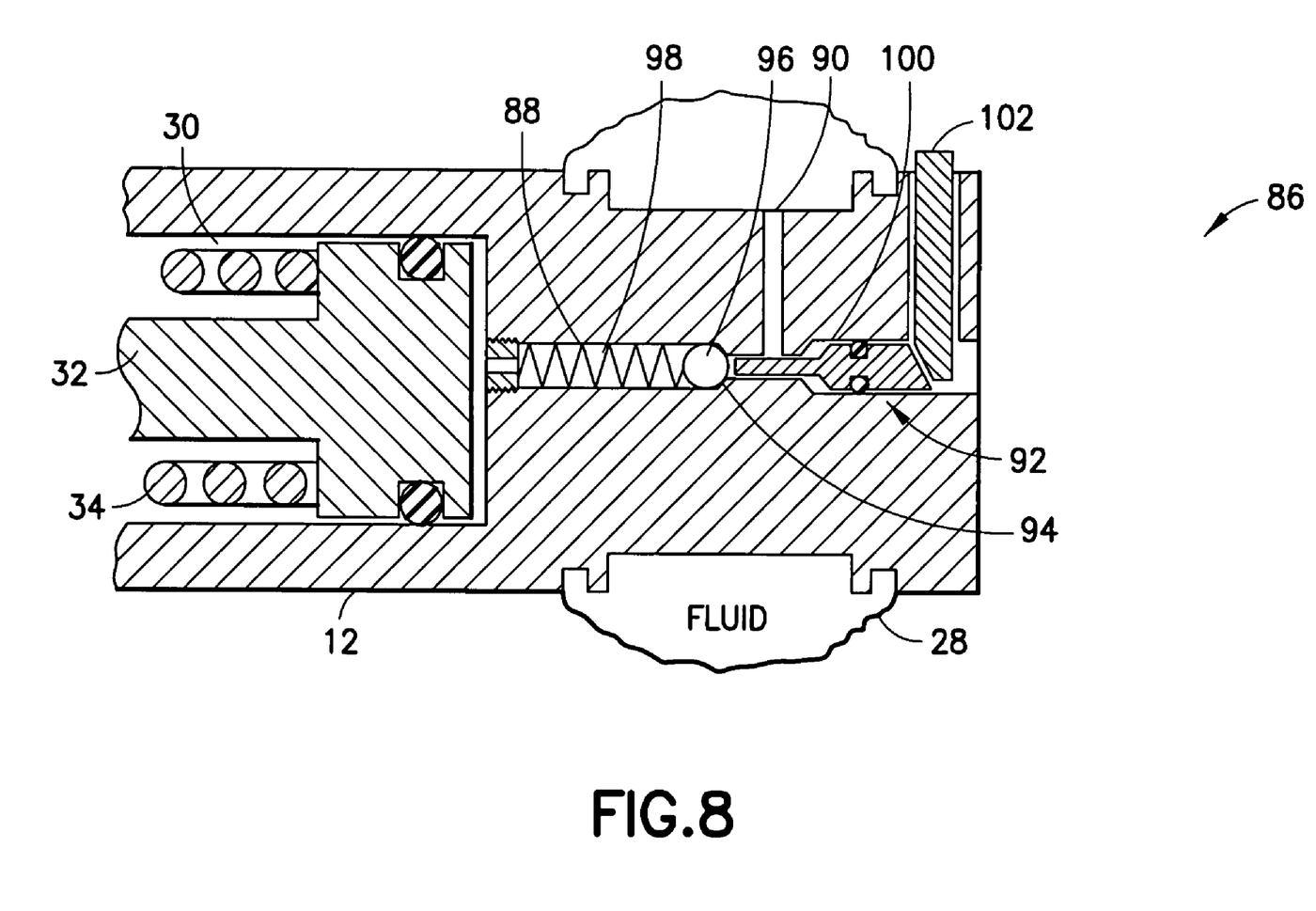
FIG. 8 is cross sectional view of portions of the tool shown in FIG. 1 taken along line 8-8 of FIG. 5.

Referring also to FIG. 8, in this embodiment the tool comprises a manual release system 86 in addition to the automatic release system 50. The manual release system 86 generally comprises a first channel 88, an outlet 90 to the reservoir 28, and a valve 92 comprising a valve seat 94, a drain ball 96, a spring 98, a drain spool 100 and a drain button 102. The first channel 88 communicates with the rear end of the ram cylinder 30. The drain ball 96 and valve seat 94 are located in the first channel 88 between the ram cylinder 30 and the outlet 90. The spring 98 biases the drain ball 96 in a sealing position against the seat 94. The drain spool 100 is slidable in the channel 88 between a rearward and a forward position. The drain spool 100 has a front end which is located against the drain ball 96. The drain spool 100 has a rear end which is sloped and is located against a sloped inner surface of the manual drain button 102. The manual drain button 102 is slideably located in the frame 12. The outer surface of the manual drain button 102 extends out of the frame 12.

The manual drain button 102 can be depressed inward by a user to move the drain spool 100 forward. The drain spool 100, thus, moves the drain ball 96 forward to unseat the ball from the valve seat. This allows hydraulic fluid to flow from the ram cylinder 30 back to the reservoir 28 through the channel 88 and the outlet 90. The spring 34 is, thus, able to push the ram 32 rearward. When the user releases the button 102, the spring 88 is able to move the ball 96 back to its sealing position on the valve seat 94. In an alternate embodiment, a different type of manual release system could be provided.

The invention as described in this application can incorporate a traditional relief valve that relieves pressure from high pressure to about 2000 psi. The relief valve can close (does not remain opened) as the ram retracts. A pilot signal from the relief valve can actuate a second valve that opens a check valve, allowing the ram to fully retract.

When the crimp/cut tool is actuated a piston pump is activated. The piston pump, on the pump inlet stroke, draws fluid from the reservoir tank through a conduit tube and check ball. On the piston pump outlet stroke fluid is pumped through the discharge conduit into the cylinder. As the piston pump is cycled repeatedly pressure builds in the hydraulic cylinder and the piston ram advances. When the piston ram is loaded or encounters resistance, pressure in the cylinder increases to a predetermined value. This predetermined value is the relief valve set pressure or cracking pressure.

Pressurized hydraulic fluid acts on the valve needle and valve seat. As the cracking pressure is reached the valve needle opens and pressure now acts on A2. As a result the needle opens and allows fluid to pass through the annular cavity surrounding A2 and the valve bore. Fluid rushes through the pilot line and acts directly on A3. Fluid flow and pressure push on surface A3 and bias the pilot spool to the leftward position. The pilot spool lifts the drain ball off the seat and allows hydraulic oil to flow directly from the cylinder to the reservoir tank. When the drain ball is lifted off the seat, the ball pushes on the bumper spool, biasing the bumper spool leftward. The drain ball will remain off its seat as long as the pilot spool remains bias to the leftward position. The spool has a small hole drilled axially through, permitting pressure to act equally on both end of the spool. With A3 of much greater magnitude than A4 the force is unbalanced and the spool will stay shifted to the leftward position. As an example, if A4 is 0.12 inch diameter and A3 is 0.5 inch diameter and all pressures are equal then the force multiplier is approximately $(0.5/0.12) \times (0.5/0.12) = 17:1$.

The bumper spool valve is bumped to the rightward position when the piston ram returns to its retracted position. There is ample force generated from the piston return spring to fully close the bumper spool valve and drain ball.

A manual drain valve can also be employed so that an operator can abort the cut or crimp cycle prior to reaching the predetermined relieve valve setting.

Figure 9:
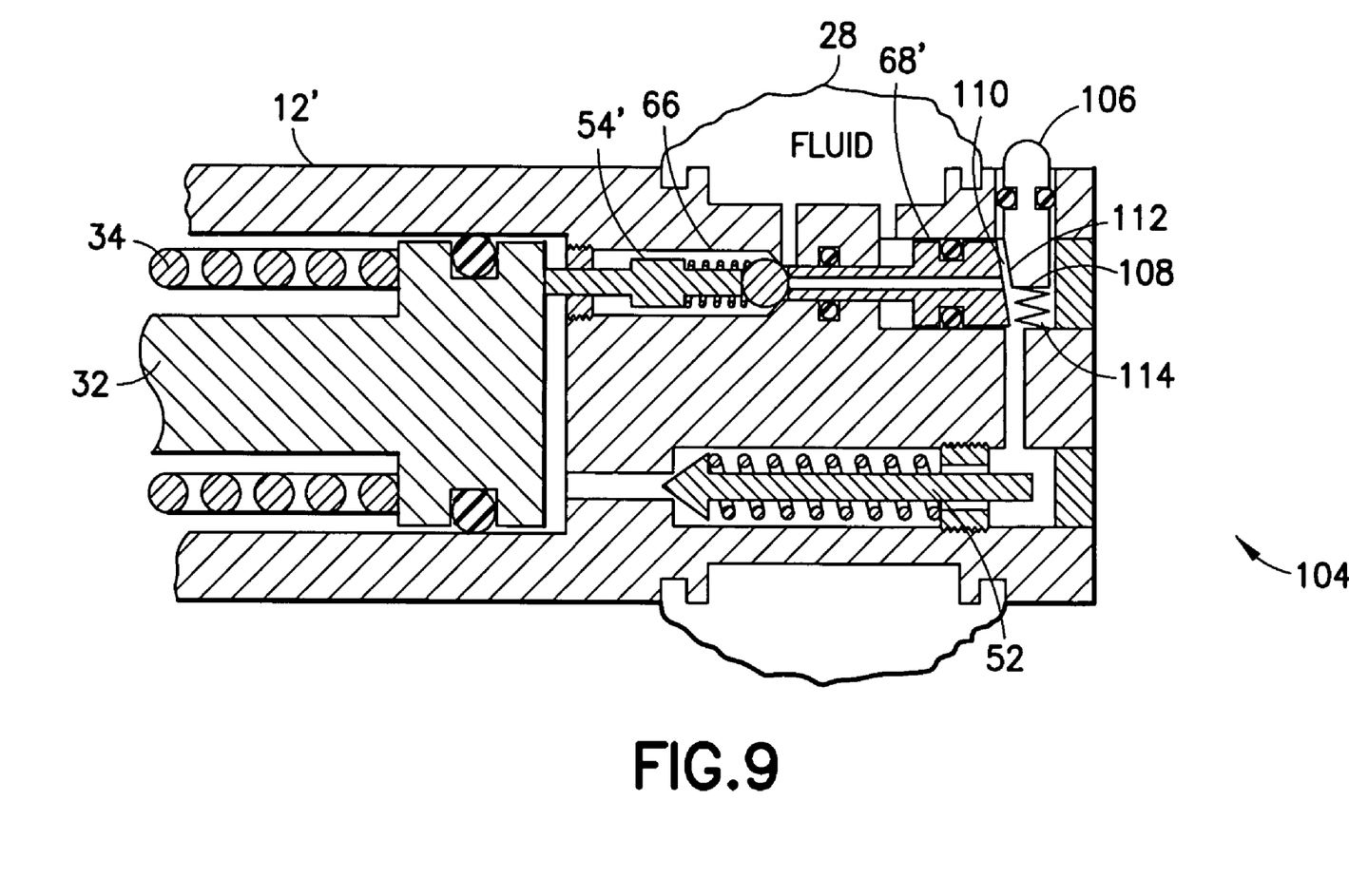
FIG. 9 is a cross sectional view similar to FIG. 7 of an alternate embodiment of the invention.

Referring also to FIG. 9, there is shown an alternate embodiment of the invention. In this embodiment the tool comprises a combined automatic release system and manual release system 104. The combined automatic release system and manual release system includes a first valve 52, a second valve 54', and a manual drain button 106. The frame 12' is substantially the same as the frame 12, but comprises a button hole 108 into the rear of the second channel 66. The second valve 54' is substantially the same as the second valve 54, but comprises a slopped rear end 110 of the pilot spool 68'. The manual drain button 106 has a slopped surface 112 to engage the slopped rear end 110. A spring 114 is provided to normally bias the button 106 in an outward position.

The valves 52 and 54' function in the same automatic manner as the valves 52, 54 of the embodiment described with reference to FIG. 7. However, a user can depress the button 106 to manually move the second valve 54' to its open position without the first valve 52 having to be opened. Thus, a combined automatic release system and manual release system is provided which shares components.

Figure 10:
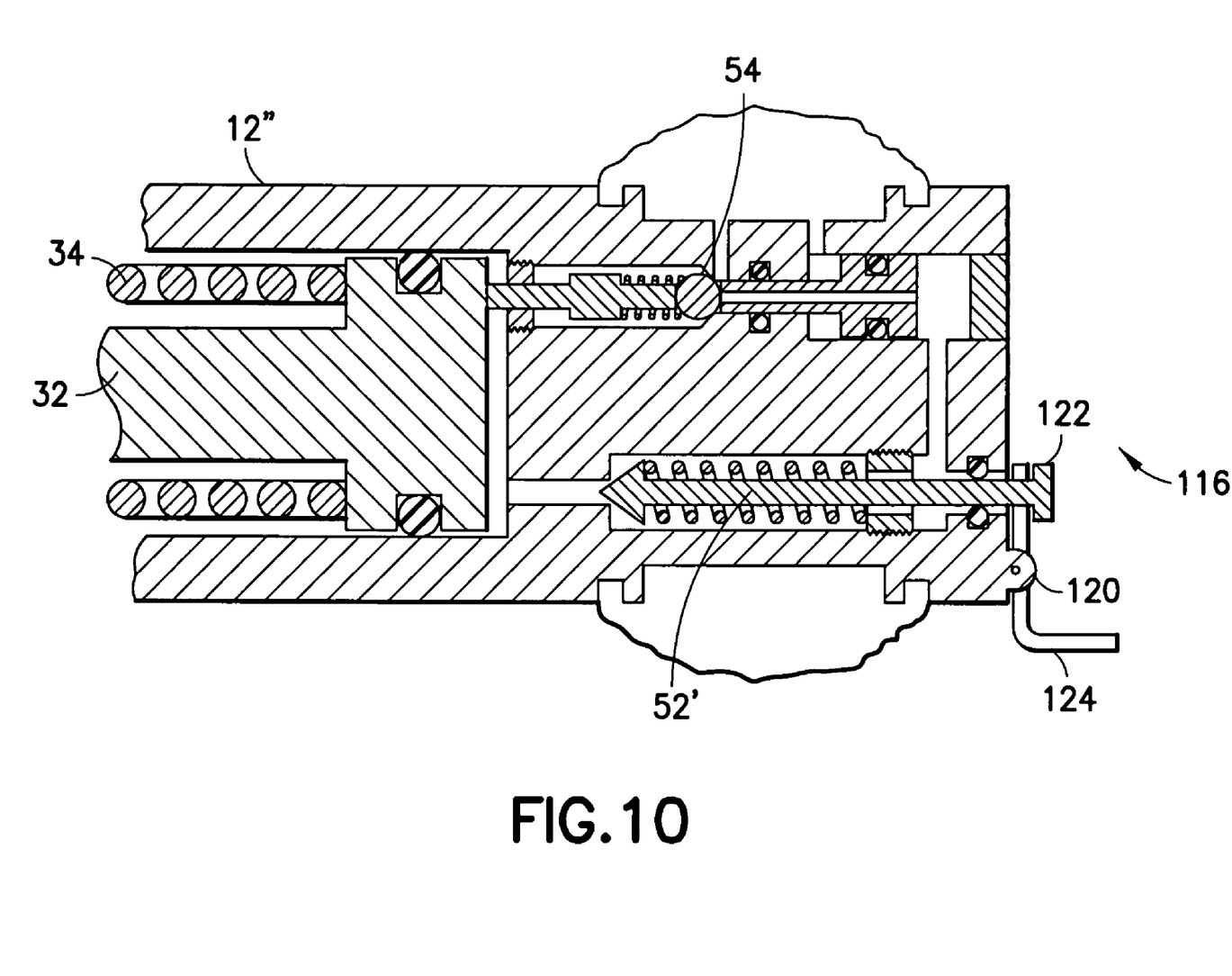
FIG. 10 is a cross sectional view similar to FIG. 7 of an alternate embodiment of the invention.

Referring also to FIG. 10, there is shown an alternate embodiment of the invention. In this embodiment the tool comprises a combined automatic release system and manual release system 116. The combined automatic release system and manual release system includes a first valve 52', a second valve 54, and a manual drain lever 124. The frame 12" is substantially the same as the frame 12, but comprises a lever mount 120. The first valve 52' is substantially the same as the first valve 52, but comprises a valve needle 52' with a rear end extension 122. The rear end extension is connected to a lever 124. The lever 124 is pivotably mounted on the lever mount 120.

The valves 52' and 54 function in the same automatic manner as the valves 52, 54 of the embodiment described with reference to FIG. 7. However, a user can move the lever 124 to manually move the first valve 52' to its open position. Thus, a combined automatic release system and manual release system is provided which shares components.

The automatic release mechanism frees the operator from actuating a mechanical release mechanism between crimps or cuts. This is advantageous from an operator standpoint when multiple crimps or cuts are performed, especially in regards to relatively small crimp or cutting tools. On small tools the jaw opening is relatively small and an automatic retraction device can save the operator time. As an example, if the crimp or cut time is 4 seconds and with the automatic release mechanism 1 second is required to retract the ram, the total crimp/cut cycle time requires a total of 5 seconds. With the traditional mechanical drain (operator actuated) the retraction time is typically about 3 seconds making the total crimp or cut cycle 7 seconds. It is clear that the automatic retraction is advantageous. On the other hand larger crimp/cut tools that require a relatively large stroke (crimp/cut ram travel) do not necessarily benefit from automatic retraction since often it is desirable to only partially retract the crimp/cut ram between cycles to save both time and energy (battery charge). As an example, a larger crimp or cutting tool may take 6 seconds to advance through the crimp/cut with an additional 3 seconds to mechanically drain (operator actuated), for a total of 9 seconds, or for a partial retraction of about 8 seconds. By partially retracting the crimp/cut ram the next advance cycle is greatly reduced and is likely to take only 3 seconds, plus another 2 seconds for another partial retract, making the total cycle 5 seconds. This saves time and battery energy. In addition, partial retraction on large crimp/cut tools allows the operator to better align the crimp dies or cutter blades to the work piece.

The subject invention can relate to hydraulic crimp tools and hydraulic cutting tools and the employment of an automated release valve that is pressure actuated. An automatic release mechanism can be provided that, after a predetermined pressure is reached, automatically retracts the crimp ram or cutting ram from the work piece.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. A hydraulic tool comprising:
   a frame;
   a ram movably connected to the frame; and
   a hydraulic drive system on the frame for moving the ram on the frame by hydraulic pressure, wherein the hydraulic drive system comprises an automatic release system for automatically releasing hydraulic fluid from the hydraulic drive system, wherein the automatic release system comprises a first valve which is adapted to be automatically opened by a predetermined hydraulic pressure and a second valve which is adapted to be opened by hydraulic fluid passing through the first valve, wherein the second valve comprises a second valve seat on the frame, a ball adapted to sit on the valve seat and a pilot spool at the valve seat and adapted to move the ball off of the valve seat.

2. A hydraulic tool as in claim 1 wherein the pilot spool comprises a conduit therethrough.

3. A hydraulic tool as in claim 2 wherein the pilot spool comprises a rear end and a relatively smaller front end.

4. A hydraulic tool as in claim 1 further comprising a bumper biased by a spring against the ball.

5. A hydraulic tool as in claim 4 wherein a portion of the bumper projects into a ram cylinder of the frame which houses the ram.

6. A hydraulic tool as in claim 1 wherein the first valve comprises a first valve seat on the frame and a valve needle having a general cone shaped end located in the first valve seat and biased by a spring against the first valve seat.

7. A hydraulic tool as in claim 1 further comprising a manual release system for manually releasing hydraulic fluid from the hydraulic drive system.

8. A hydraulic tool as in claim 7 wherein the manual release system comprises a member adapted to be manually moved by a user to manually move a portion of the second valve.

9. A hydraulic tool as in claim 7 wherein the manual release system comprises a member adapted to be manually moved by a user to manually move a portion of the first valve.

10. A hydraulic tool as in claim 7 wherein the manual release system is substantially separate from the first and second valves.

11. A hydraulic tool comprising:
a frame;
a ram movably connected to the frame; and
a hydraulic drive system on the frame for moving the ram on the frame by hydraulic pressure, wherein the hydraulic drive system comprises an automatic release system for automatically releasing hydraulic fluid from the hydraulic drive system, wherein the automatic release system comprises a first valve and a second valve, wherein the second valve is adapted to be closed by physical contact of the ram against a bumper portion of the second valve.

12. A hydraulic tool as in claim 11 wherein the second valve comprises a second valve seat on the frame, a ball adapted to sit on the valve seat and a pilot spool at the valve seat and adapted to move the ball off of the valve seat.

13. A hydraulic tool as in claim 12 wherein the pilot spool comprises a conduit therethrough.

14. A hydraulic tool as in claim 13 wherein the pilot spool comprises a rear end and a relatively smaller front end.

15. A hydraulic tool as in claim 12 wherein the bumper portion biased by a spring against the ball.

16. A hydraulic tool as in claim 15 wherein the bumper portion projects into a rain cylinder of the frame which houses the ram.

17. A hydraulic tool as in claim 12 wherein the first valve comprises a first valve seat on the frame and a. valve needle having a general cone shaped end located in the first valve seat and biased by a spring against the first valve seat.

18. A hydraulic tool as in claim 11 further comprising a manual release system for manually releasing hydraulic fluid from the hydraulic drive system.

19. A hydraulic tool as in claim 18 wherein the manual release system comprises a member adapted to be manually moved by a user to manually move a portion of the second valve.

20. A hydraulic tool as in claim 18 wherein the manual release system comprises a member adapted to be manually moved by a user to manually move a portion of the first valve.

21. A hydraulic tool as in claim 18 wherein the manual release system is substantially separate from the first and second valves.

22. A hydraulic tool comprising:
a frame;
a ram movably connected to the frame; and
a hydraulic drive system on the frame for moving the ram on the frame by hydraulic pressure, wherein the hydraulic drive system comprises an automatic release system for automatically releasing hydraulic fluid from the hydraulic drive system and a manual release system for manually releasing hydraulic fluid from the hydraulic drive system, wherein the automatic release system comprises a first valve and a second valve, and wherein the manual release system is adapted to allow a user to manually move a portion of the first valve or the second valve.

23. A hydraulic tool as in claim 22 wherein the second valve comprises a second valve seat on the frame, a ball adapted to sit on the valve seat and a pilot spool at the valve seat and adapted to move the ball off of the valve seat, and wherein the pilot spool comprises a conduit therethrough, and wherein the first valve is adapted to be automatically opened by a predetermined hydraulic pressure and the second valve is adapted to be opened by hydraulic fluid passing through the first valve.

24. A hydraulic tool comprising:
a frame;
a ram movably connected to the frame; and
a hydraulic drive system on the frame for moving the ram on the frame by hydraulic pressure, wherein the hydraulic drive system comprises an automatic release system for automatically releasing hydraulic fluid from the hydraulic drive system, wherein the automatic release system comprises a first valve which is adapted to be automatically opened by a predetermined hydraulic pressure and a second valve which is adapted to be opened by hydraulic fluid passing through the first valve, wherein the automatic release system is configured to close the first valve while the second valve remains open.

25. A hydraulic tool as in claim 24 wherein the automatic release system is configured to close the first valve before the ram reaches its rearward position.

* * * * *